C. Locher,
Baling Press.
No. 106,703.      Patented Aug. 23, 1870.
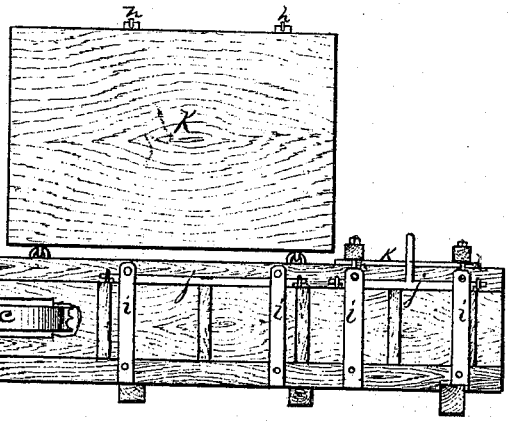
Witnesses:      Inventor
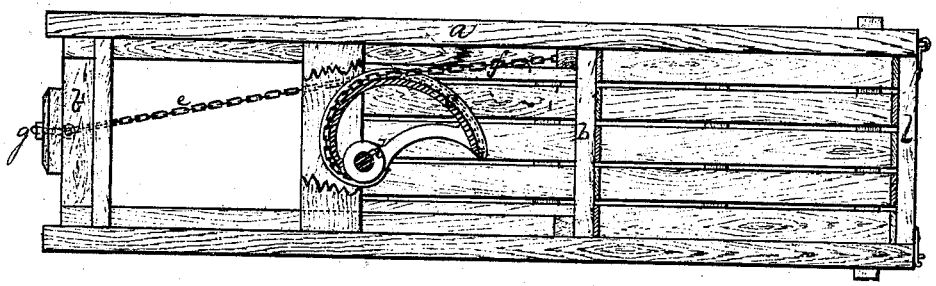

UNITED STATES PATENT OFFICE.

CONRAD LOCHER, OF OROVILLE, CALIFORNIA.

IMPROVEMENT IN BALING-PRESSES.

Specification forming part of Letters Patent No. 106,703, dated August 23, 1870.

*To all whom it may concern:*

Be it known that I, CONRAD LOCHER, of Oroville, in the county of Butte and State of California, have invented a new and Improved Baling-Press; and I do hereby declare that the following is a full and exact description of the same, reference being had to the accompanying drawing, and to the letters of reference marked thereon.

Figure I is a side view of the press. Fig. II is a plan. Fig. III is a side view of one of the spring-catches.

This invention relates to that class of baling-presses which is operated by means of a cam; and consists in certain details of construction, which will be fully described hereinafter.

To enable others skilled in the art to make and use my invention, I will proceed to describe its construction and operation.

$a$ represents the outside of the press; $b$, the follower; $c$, the cam, with grooves for chains; $d$, the cam-shaft; $e$, the chain which draws up the follower; $f$, the chain that withdraws the follower; $g$, the eyebolt attached to the chain $e$, wherewith the size of bale is regulated; $h$, the hooks that engage with spring-catches $i$. $j$ are release-bars. By turning them on the edge they press the spring-catches out of the hooks $h$. $k$ are the top doors, which are both opened to fill the press. $l$ is the front door, where the bale is taken out when pressed. $m$ is the lever to which horses are hitched. The lever is moved only three-quarters of a circle.

The motion of the cam is such that the follower moves fast in the start, and the speed decreases as the substance to be pressed becomes more solid.

The cam may be made the same shape, but instead of grooves have cogs, and a rack to gear into those cogs, which takes the place of the chains. These presses are built horizontal, and may be put on wheels and taken out into the field. The stroke of the follower being long, it does not require much tramping, thereby saving labor and time.

The width of the bales may be varied twelve inches by screwing in or letting out the follower by means of the eyebolt.

What I claim as my invention, and desire to secure by Letters Patent, is—

1. The spring-catches $i$, hooks $h$, and release-bars $j$, when arranged as described, for the purpose set forth.

2. The follower $b$, cam $c$, shaft $d$, chains $e$ and $f$, and eyebolt $g$, when constructed and arranged as described, for the purpose set forth.

This specification signed and witnessed this 9th day of July, 1869.

C. LOCHER.

Witnesses:
JOHN DICK,
J. M. BROCK.